Dec. 12, 1967          G. WINTRISS          3,358,096
POWER-OPERATED TOOL ACTUATOR
Filed Sept. 1, 1965
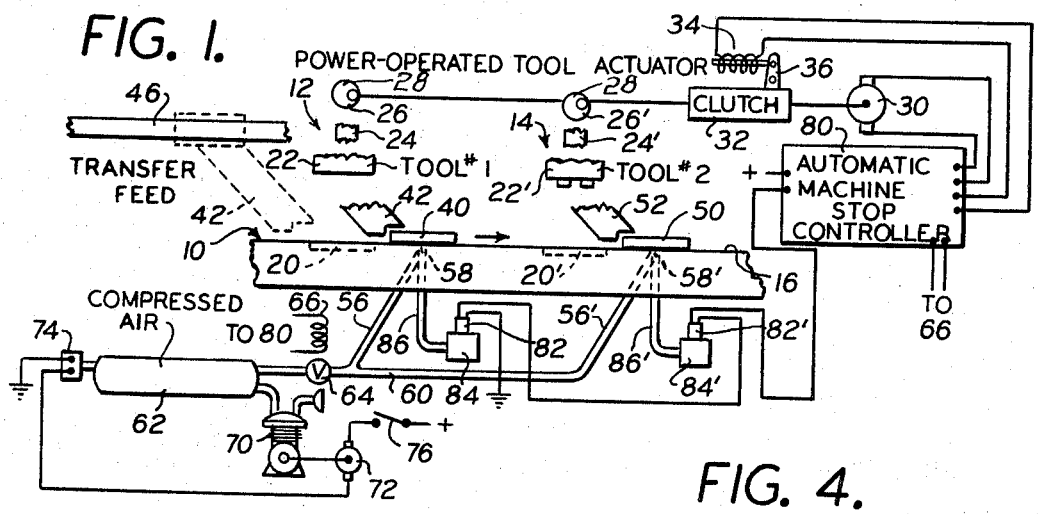
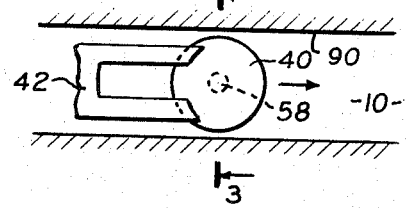
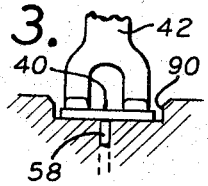
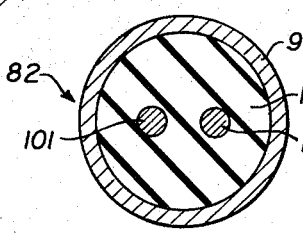
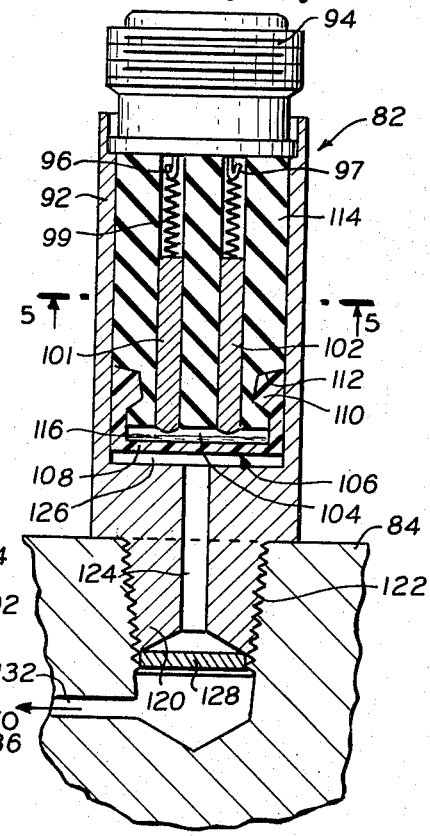
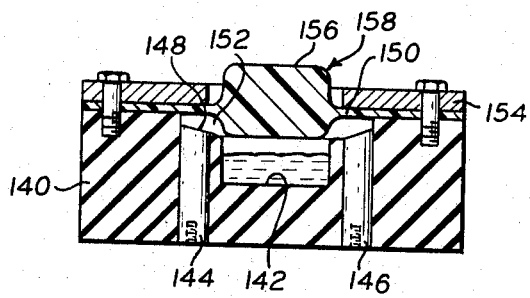
INVENTOR
George Wintriss
BY
ATTORNEYS.

United States Patent Office 3,358,096
Patented Dec. 12, 1967

3,358,096
POWER-OPERATED TOOL ACTUATOR
George Wintriss, Carversville, Pa., assignor to Industrionics Controls, Inc., New York, N.Y., a corporation of New York
Filed Sept. 1, 1965, Ser. No. 484,202
11 Claims. (Cl. 200—81.6)

ABSTRACT OF THE DISCLOSURE

This actuator for a power-operated tool has a transfer or delivery table along which work pieces travel from a work station of the machine and at a predetermined time in the cycle of the machine. There is an airflow orifice along the path of the work piece so that passage of the work piece changes the air flow and causes a pressure wave to travel back through the air passage and to actuate switches of control mechanism correlated with the time cycle of the machine. Failure to detect a passage of a piece indicates malfunctioning. Everything is enclosed and protected, and the outflowing air stream or streams are the only communication with the outside.

Brief description of the invention

This invention relates to apparatus for controlling the operation of automatic machines, and to determination that work pieces have been dislodged from a work station. One of the difficult problems that has been encountered in the control of automatic machines has been the reliable determination of the passage of a work piece from a work station to a discharge or to a subsequent work station of a transfer machine.

Detectors that are displaced by the work piece are subject to severe wear and they are exposed to oil and other fluids used on the work pieces. This often leads to unreliable operation, especially when the detector is electrically operated. Other types which have the work piece interrupt a light beam have also proved unreliable because of the presence of splatter and dirt, which often obscures the source of light.

It is an object of this invention to provide an improved control for an automatic machine and to provide more reliable means for detecting the passage of a work piece from a work station to a delivery location or to a succeeding work station of a transfer machine.

Another object is to provide a work piece detector that is not adversely affected by splatter and dirt; the detector of this invention being self-cleaning when operated in an environment where splatter and dirt present a problem. In addition, the detector of this invention is simple and has no moving parts except its switch; the work piece itself taking the place of any other moving part of the detector.

Other objects, features and advantages of the invention will appear or be pointed out as the description proceeds.

Brief description of the drawing

In the drawing, forming a part hereof, in which like reference characters indicate corresponding parts in all the views:

FIGURE 1 is a diagrammatic view of an automatic machine having two work stations and a transfer feed, and equipped with the control apparatus of this invention;

FIGURE 2 is an enlarged top plan view of a portion of the apparatus shown in FIGURE 1;

FIGURE 3 is an enlarged sectional view taken on the line 3—3 of FIGURE 1, this being equivalent to the line 3'—3' of FIGURE 2;

FIGURE 4 is a greatly enlarged sectional view showing one of the switch means of FIGURE 1;

FIGURE 5 is a sectional view taken on the line 5—5 of FIGURE 4; and

FIGURE 6 is a modified switch construction which can be used in the combination of FIGURE 1 if operated by pressure instead of suction.

Detailed description of the invention

The automatic machine illustrated diagrammatically in FIGURE 1 includes a transfer table 10 having two successive work stations 12 and 14 and a discharge or delivery portion 16 of the transfer table. The diagrammatic illustration shows a representation of a fixed die part 20 at the work station 12, and a movable die part or tool 22 which is moved toward and from the die part 20 by a ram 24 operated by a crank or eccentric 26 from a drive shaft 18. At the work station 14 there are similar elements represented by the same reference characters with a prime appended. The eccentric 26' is shown as driven from the same drive shaft 28 as drives the eccentric 26.

The drive shaft 28 is driven from a motor 30 through a clutch 32 which is engaged by a solenoid 34 connected with a crank 36. Whenever the supply of energy to the solenoid 34 is interrupted, the clutch 32 is disengaged.

FIGURE 1 shows a work piece 40 which has been displaced from the work station 12 by a transfer feed arm 42. This work piece 40 is in the process of being moved to the next work station 14. The transfer feed arm 42 is connected with a slide 46 for imparting reciprocating movement to the feed arm 42 and the position of the feed arm 42, before it engages the work piece 40, is shown in dotted lines in FIGURE 1, at the left-hand end of the figure.

Another work piece 50 is shown in the process of being moved to the delivery portion 16 of the transfer table by a transfer feed arm 52 which is also connected with the slide 46 so as to move in unison with the transfer feed arm 42. It will be understood that the slide 46 operates the transfer feed arms 42 and 52 in timed relation with the movement of the movable dies or tools 22 and 22', in accordance with conventional operation of automatic transfer machines; and no further description or illustration of the automatic machine and transfer mechanism is necessary for a complete understanding of this invention.

An air pipe 56 extends upward through the transfer table 10 and has an airflow orifice 58 at its upper end where the pipe 56 opens through the top of the transfer table. This airflow orifice 58 is located along the path of the work piece 40 as the work piece is transferred from the work station 12 to the work station 14. The flow of air under the work piece, and which is deflected by the work piece parallel to the table, expands as it flows transversely away from the orifice 58 and creates a pressure less than atmospheric pressure so that there is an air pressure differential holding the work piece 40 down on the table 10 while the work piece is over the orifice 58. At the same time the work piece, in deflecting the air flow, causes some of the air to flow back into passage 86 with resulting increase in pressure in that passage. There is a similar air pipe 56' with an airflow orifice 58' beyond the work station 14 and along the path of travel of the work pieces from the work station 14 to the delivery portion 16 of the transfer table.

In the preferred construction, the air pipes 56 and 56' are connected with a header 60 which leads to a compressed air tank 62. The supply of compressed air to the header 60 is controlled by a valve 64 operated by a magnetic coil 66 which opens and closes the valve.

FIGURE 1 shows the compressed air tank 62 supplied with air by a compressor 70 which is driven by a motor 72 in response to operation of a pressure-responsive switch 74 in communication with the interior of the tank 62, in accordance with conventional practice. The motor 72 has a master control switch 76.

The operation of the automatic machine illustrated in FIGURE 1 is controlled by an automatic machine stop control 80 which supplies power to the motor 30 and to the solenoid 34. This controller 80 also connects with the valve coil 66 for shutting off the supply of air to the header 60 when the machine is not in operation.

The signals for the controller come from switches 82 and 82' attached to housings 84 and 84'. There is an air passage 86 leading from the housing 84 to the airflow orifice 58; and there is a similar passage 86' leading from the housing 84' to the airflow orifice 58'. These passages 86 and 86' meet the air pipes 56 and 56', respectively, at the airflow orifices 58 and 58', respectively, at acute angles so that the air flow from the pipes 56 and 56' exert an aspirator action and produce suction in the passages 86 and 86'. This suction is proportional to the velocity of the air flow; and in the preferred construction, the suction in the passages 86 and 86' is used to hold the switches 82 and 82', respectively, in open positions.

When there is no work piece in the air stream which flows from the airflow orifice 58, the suction in the pipe 56 remains constant. When the work piece 50 moves across the airflow orifice 58 there is a change in the air pressure in the passages 86 and 86' to a positive pressure as previously explained, and this pressure closes the switches 82 or 82'.

The controller 80 operates in accordance with the cycle of the machine and requires that the switch 82 close its circuit at the part of the cycle when a work piece is to be transferred from the work station 12 to the work station 14. If no transfer occurs, because of the failure of the transfer mechanism to operate, or because of failure of the strippers to eject the work piece from the fixed die 20, or because of any other failure in the normal operation of the machine, then the controller 80 stops the machine before any damage can occur. Such automatic controls sometimes are used to stop the motor, and sometimes are used to disengage a clutch, the latter being often quicker since it does not involve the motor momentum, and the particular controller used with this invention is not important. The controller 80 is representative of automatic means for stopping further operation of the machine if the air stream from the airflow orifice 58 does not encounter a work piece during the part of the cycle where a work piece would normally pass across this airflow orifice.

The switch 82' is operated by the work piece 50 passing across the air stream from the airflow orifice 58' and the switches 82 and 82' are connected in series so that unless the normal operation occurs at every work station, the machine will stop.

FIGURE 2 shows the work piece 50 being shifted along the transfer table 10 by the transfer feed arm 42 with guides 90 along both sides of the table for holding the work piece on an approximate course as it passes over the airflow orifice 58.

FIGURE 3 shows the same structure as FIGURE 2 but from a different position.

FIGURE 4 shows the preferred construction of the switch 82. It will be understood that the switch 82' may be of identical construction. The switch includes a housing 92 with a socket 94 at its upper end for connection with prongs of a connector leading to the next element of the circuit. Contacts 96 and 97 in the socket 94, extend downwardly and contact with springs 99 which electrically connect the contacts 96 and 97 to switch contact elements 101 and 102, respectively.

The ends of these contact elements 101 and 102 form part of an upper wall of a chamber 104. The lower wall of the chamber 104 is formed by a plastic, preferably rubber, element 106 which has a diaphragm portion 108 that forms the wall opposite the switch elements 101 and 102. This plastic element 106 extends upwardly along the inside wall of the housing 92 and has a bead 110 at its upper edge extending into a circumferential recess 112 in a bushing 114 by which the contacts 101 and 102 are carried. Thus the plastic element 106 forms the bottom and side walls of the chamber 104 and the bead 110 not only holds the plastic element 106 in position, but also provides a seal for the chamber 104.

There is a quantity of mercury 116 in the chamber 104. When the diaphragm 108 is in its normal undeflected position, as shown in FIGURE 4, the mercury level is below the contacts 101 and 102 and the circuit between these contacts is open. The mercury level rises and the mercury touches the contacts when the element 106 is subjected to pressure from the passage 86. The quantity of mercury in the chamber 104 is sufficient so that the mercury can be moved into contact with both of the contacts 101 and 102, regardless of the orientation of the housing 92. The switch 82 cannot be used in a position completely upside down from that shown in FIGURE 4, however, because with that orientation the switch would always remain closed.

The lower end of the housing 92 has an extension 120 with a tapered thread 122 which screws into a complementary thread in the top of the housing 84. A passage 124 leads through the extension 120 and upward into a chamber 126 in the housing 92 under the plastic element 106. There is preferably a filter 128 in a counterbore in the lower end of the passage 124.

In the housing 84, the passage 124 communicates with another passage 132 leading to the air passage 86 (FIGURE 1). When there is suction on this passage 86, a partial vacuum in the housing 84 (FIGURE 4) holds the flexible diaphragm 108 down.

FIGURE 6 shows a different switch construction in which a housing 140 contains a mercury well 142 and electric circuit contacts 144 and 146, which are exposed through a sloping side wall 148 which surrounds the upper edge of the well 142. A diaphragm 150 rounds the upper end of the housing 140 and forms a top wall enclosing a chamber 152 which is formed by the well 142 and the space above the sloping sides 148.

The diaphragm 150 is clamped to the housing 140 around the edge portions of the diaphragm and housing by an annular cover 154. In the construction illustrated, the diaphragm 150 is molded with a button 156 extending upwardly and a protuberance 158 extending downwardly from the diaphragm inside the chamber 152. The cross section of the protuberance 158 is slightly less than the cross section of the well 142, but when the button 156 is pushed to flex the diaphragm 150 downward, the protuberance 158 enters the well 142 and displaces the mercury from the well so that the mercury partially fills the other space in the chamber 152 and bridges the contacts 144 and 156 so as to close the electric circuit between these contacts.

In the construction shown in FIGURE 6, therefore, the button 156 and protuberance 158 comprise an operating element which is partly on the outside of the chamber 156 but which extends into the chamber and which is movable into the well to displace the mercury from the well. This switch of FIGURE 6 can be made to operate in any orientation of the housing 140 since the mercury does not have to be in the well 142 when the circuit of the switch is open. It is sufficient that the contacts 144 and 146 be located far enough from the diaphragm 150 so that with the housing 140 upside down, as compared to its position in FIGURE 6, the mercury on the diaphragm 150 is not of sufficient depth to reach both of the contacts 144 and 146 at the same time. It will, however, touch them if the diaphragm is flexed so as to move the mercury toward the contacts; and when the switch is used in this upside down position, the well 142 serves as the air space for the switch. It is necessary for the switch to have an air space which has a substantial volume in proportion to the change of volume of the switch since this limits the pressure required to operate the switch.

The switch shown in FIGURE 6 can be used in the control circuits of FIGURE 1 if the top of the diaphragm 150 is suitably enclosed to respond to pressure pulses.

The preferred embodiments of the invention have been illustrated and described, but changes and modifications can be made and some features can be used in different combinations without departing from the invention as defined in the claims.

What is claimed is:

1. In an automatic machine having a station from which a work piece is delivered at a predetermined time in a normal cycle of the machine, a transfer table along which the work piece travels from the work station, an airflow orifice adjacent to the path of the work piece and in position to have its air stream altered as said work piece travels past the airflow orifice, a piping system through which air flows to the orifice, an enclosed electric switch having a pressure-responsive actuator in direct communication with the interior of the piping system and subject to pressure fluctuations in the piping system upstream from the orifice resulting from alterations in the air stream discharging from the piping system through said orifice for moving the switch between open and closed position, and control apparatus for stopping the machine, said switch being in a circuit of said control apparatus.

2. The automatic machine described in claim 1 characterized by the machine having several work stations and different orifices through which air is discharged from the piping system for the different work stations, and separate switches for the different work stations communicating with the interior of portions of the piping system leading to the different orifices, and the different switches having their pressure-responsive actuators connected with different work stations, but all of the switches being connected in series with one another.

3. The automatic machine described in claim 1 characterized by a source of compressed air for the piping system, and the pressure-responsive actuator having a passage communicating with the compressed air flow passage of the piping system adjacent to said orifice and at an acute angle in a direction for aspirator action whereby increase in the velocity of the discharged air caused by the adjacent work piece causes the compressed air stream to aspirate air and produce a suction on the passage from the actuator.

4. The automatic machine described in claim 1 characterized by the electric switch having a flexible diaphragm which is the actuator of the switch, a first chamber on one side of the diaphragm with two contact elements spaced from one another, mercury in the first chamber in a quantity to bridge the space between the contact elements when the diaphragm is in one position, a second chamber on the other side of the diaphragm and having a passage communicating with the piping system passage to the airflow orifice for effecting pressure changes in the second chamber to move the diaphragm between different positions, said diaphragm being movable into one position which provides space for the mercury with the mercury out of contact with one of said contact elements.

5. The automatic machine described in claim 3 characterized by each of the electric switches having a flexible diaphragm dividing the interior of the switch into a first and a second chamber, the diaphragm constituting the actuator for the switch, mercury in the first chamber, electric contacts in the first chamber in position to be bridged by the mercury to close the switch when the chamber is contracted, the passage that communicates with the compressed air flow passage being in communication with the second chamber and on the opposite side of the diaphragm from the mercury for moving the diaphragm to expand the volume of the first chamber in response to suction on said passage that connects with the compressed air flow passage, and to contract the volume of said first chamber in response to increase in pressure in said passage.

6. An electric control circuit switch including a chamber, a flexible diaphragm forming one wall of the chamber and movable to expand and contract the volume of the chamber, mercury in the chamber and only partially filling the chamber, electric contacts in the chamber spaced from one another, and at least one of which is out of contact with the mercury when the chamber is in an expanded condition and in an intended range of orientations, at least a part of the chamber being a well in which a quantity of mercury is confined by the sides of the well when not displaced to touch the contacts, the quantity of mercury being sufficient to touch both contacts and to close a circuit between them when the volume of the chamber is contracted.

7. The electric control circuit switch described in claim 6 characterized by the quantity of mercury being correlated with the locations of the contacts so as to touch both contacts and close the circuit for all orientations of the chamber.

8. The electric control circuit switch described in claim 7 characterized by the contacts being located in the chamber but spaced from the wall formed by the flexible diaphragm, and spaced above a part of the chamber wall confronting the diaphragm, the chamber having the capacity to hold the mercury with its top surface below at least one of the contacts when the switch is oriented with the diaphragm lowermost and also when oriented with the diaphragm uppermost.

9. The electric control circuit switch described in claim 8 characterized by the chamber having a depression for mercury in a wall thereof confronting the wall formed by the flexible diaphragm, the contacts being on opposite sides of the depression, and means securing the edge portions of the diaphragm to the rest of the chamber while leaving the mid portion of the diaphragm free to flex toward and from the depression.

10. The electric control circuit switch described in claim 9 characterized by the depression being a well in a center region of the wall of the chamber, and the chamber having sloping walls around the well extending upward to the flexible diaphragm wall, the center portion of the diaphragm confronting the well having a protuberance thereon that extends toward the well and that enters the well to displace mercury therefrom when the center portion of the diaphragm is deflected toward the well.

11. An electric control circuit switch including a chamber having a mercury well therein containing a substantial quantity of mercury confined laterally by the sides of the well, switch contacts in the chamber spaced from one another and in position to be bridged by the mercury to close a circuit between the contacts when a quantity of mercury is displaced from the well, an operating element on the outside of the chamber and extending into the chamber adjacent to the top surface of the mass of mercury in the well, the operating element having an inner end portion of a cross section somewhat less than the cross section of the well and being movable into the well to displace the mercury therefrom for bringing the mercury up out of the well and into position to bridge the contacts and to close said circuit between them.

References Cited

UNITED STATES PATENTS

| 2,260,781 | 10/1941 | Kisylia et al. | 235—98 |
| 2,560,717 | 7/1951 | Boyer | 200—152 |
| 2,816,708 | 12/1957 | Menoher | 235—92 |

BERNARD A. GILHEANY, *Primary Examiner.*

H. BROOME, *Assistant Examiner.*